United States Patent [19]

Yamaoka et al.

[11] Patent Number: 5,143,644
[45] Date of Patent: Sep. 1, 1992

[54] CARBOXYLIC ACID ESTER COMPOUNDS, AND THEIR RELATED MATTERS AND METHOD OF PRODUCING THE SAME

[75] Inventors: Hideo Yamaoka; Toyji Shimizu; Fujihisa Matsunaga; Shinichi Nishiyama; Toru Yamanaka; Shoichi Miyakoshi, all of Ichihara, Japan

[73] Assignee: Mitsui Petrochemical Industries, Ltd., Tokyo, Japan

[21] Appl. No.: 505,592

[22] Filed: Apr. 6, 1990

[30] Foreign Application Priority Data

| Apr. 6, 1989 | [JP] | Japan | 1-87301 |
| Apr. 6, 1989 | [JP] | Japan | 1-87302 |
| Apr. 6, 1989 | [JP] | Japan | 1-87303 |
| Apr. 6, 1989 | [JP] | Japan | 1-87304 |
| Apr. 6, 1989 | [JP] | Japan | 1-87305 |

[51] Int. Cl.$^5$ .............. C09K 19/32; C07C 69/76; G02F 1/13
[52] U.S. Cl. .............. 252/299.62; 252/299.01; 560/56; 560/100; 359/103
[58] Field of Search ........... 252/299.01, 299.6, 299.62; 560/56, 100; 359/103

[56] References Cited

U.S. PATENT DOCUMENTS

| 3,819,531 | 6/1974 | Saeva et al. | 252/408 |
| 4,680,137 | 6/1987 | Isoyama et al. | 282/299.62 |
| 4,921,632 | 5/1989 | Nakamura et al. | 252/299.1 |
| 4,943,651 | 7/1990 | Nishiyama et al. | 560/56 |
| 5,053,164 | 10/1991 | Nishiyama et al. | 252/299.62 |

FOREIGN PATENT DOCUMENTS 62-10045  1/1987  Japan.
62-135449 6/1987  Japan.
63-233932 9/1988  Japan.

Primary Examiner—Robert L. Stoll
Assistant Examiner—Shean C. Wu
Attorney, Agent, or Firm—Sherman and Shalloway

[57] ABSTRACT

This invention relates to carboxylic acid ester compounds or liquid crystal compounds represented by the following formula [A], liquid crystal compositions and liquid crystal elements using these compounds, the method of producing said liquid crystal elements, and other uses.

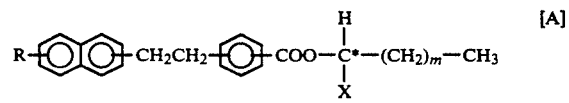

wherein R represents one radical selected from the group consisting of an alkyl group having 6-18 carbon atoms, an alkoxy group having 6-18 carbon atoms, and a halogenated alkyl group having 6-18 carbon atoms, X represents —CF$_3$ or —CH$_2$—CH$_3$, m is an integral number of 1-10 when X is —CF$_3$, and an integral number of 2-10 when X is —CH$_2$—CH$_3$, and C* represents an asymmetric carbon atom.

28 Claims, 3 Drawing Sheets

CARBOXYLIC ACID ESTER COMPOUNDS, AND THEIR RELATED MATTERS AND METHOD OF PRODUCING THE SAME

BACKGROUND OF THE INVENTION

This invention relates to novel carboxylic acid ester compounds and liquid crystal compounds, liquid crystal compositions and liquid crystal elements using these compounds, the method of producing said liquid crystal elements, and their uses.

Conventionally, a CRT device has been most widely used as a display device for office automation (OA) equipments. Recently, in the field of OA equipments having such display device, a small-sized and light-weighted equipment and an enlarged and thinned scope of display device have been increasingly desired. To meet the respective uses and desires, various new display devices have been developed, instead of the conventionally used CRT device. Such display devices include, for example, liquid crystal display, plasma display, Light Emitting Diode display, Electro Luminesence display, and ECD display.

Among these display devices, the liquid crystal display is a device for actualizing an electric signal on a scope by affording the electric signal to a switching element using a liquid crystal compound, changing the state of the liquid crystal compound in the switching element correspondingly to the electric signal, thereby controlling the light permeability. This liquid crystal device has been already put into practical use not only as the liquid crystal display for OA equipments but also as a display device for digital watch and portable game machine. It also comes to be used as a display device for dynamic image such as a small-sized television.

The display device using a liquid crystal compound can be driven in a twist nematic (TN) mode. This TN mode is a system of utilizing the dielectric anisotropy of the molecule in the nematic phase of the liquid crystal compound for displaying, and the display device is driven by the energy proportional to the square of an externally applied electric field ($f\alpha E^2$).

However, as a change of the molecular position of the liquid crystal compound in the element is required to change a displayed picture image when this system is adapted, it has problems of an extension of the driving time, and thus an increase in the voltage required to change the molecular position of the liquid crystal compound, namely an increase in the consumed electric power. Further, as such switching element is not extremely excellent in switching threshold characteristic, a leakage voltage is applied to the extent of the non-displayed picture image part when a high-speed change of the molecular position for switching operation is tried, often resulting in a remakable reduction in contrast of the display device.

For the reasons mentioned above, the display system by the conventional TN mode is not perfectly proper display system, particularly, as a display device for large-sized image plane or a display device for dynamic image such as small-sized digital television.

In the meantime, a display device using a super twist nematic (STN) mode in which the switching threshold characteristic of the TN mode is improved has been also used. As the switching threshold characteristic is improved by using the STN mode, the contrast of the display is improved.

However, this method is not different from the TN mode in the utilization of dielectric anisotropy, and thus the similar tendency as the display device using the TN mode is shown when used as the display device for large image plane or the display device for dynamic image such as small-sized digital television, because of this long switching time.

Contrary to this, in 1975, R. B. Meyer et al, found that an organic compound synthesized by them showed a ferroelectric property. In 1980, further, N. A. Clark et al. suggested a possibility of using an element in which the ferroelectric liquid crystal compound as described above is filled in a cell having a small gap as an optical switching element, i.e., a display device (Japanese Patent Application No. 56-107216).

The switching element using the above ferroelectric liquid crystal compound can be actuated as the switching element only by changing the orientation direction of the molecule of the liquid crystal product, different from the switching elements utilizing the TN mode or STN mode, so that the switching time is extremely shortened. Further, as the value of $Ps \times E$ which is given by the spontaneous polarization (Ps) and the electric field strength (E) possessed by the ferroelectric liquid crystal compound is an effective energy strength for changing the orientation direction of the molecule in the liquid crystal compound, the consumed electric power is extremely reduced. This ferroelectric liquid crystal compound is extremely excellent in switching threshold characteristic, and particularly suitably used for dynamic image display devices, as it has two stable states or bistability, depending on the direction of the applied electric field.

When used in the optical switching element, the ferroelectric liquid crystal compound is required to have various characteristics such as an operating temperature range around or less than ordinary temperature, a broad operating temperature width, a high(rapid) switching speed, and a switching threshold value voltage within a proper range. Particularly, the operating temperature range is an especially important factor for the practical use of ferroelectric liquid crystal compounds.

However, the conventionally known ferroelectric liquid crystal compounds generally have high operating temperatures, and the operating temperature width and other characteristics are not sufficient even if they are ferroelectric liquid crystal compounds operating at around room temperature, as described in, for example, a paper by R. B. Meyer et al. [J. de Phys., Vol. 36, p. L-69, 1975]; a paper by Masaaki Taguchi and Takamasa Harada, [the Preliminary Manuscripts for the 11th Liquid Crystal Discussion, p. 168, 1985], and thus those practically satisfied as ferroelectric liquid crystal compounds have not been obtained yet.

Further, various liquid crystal compounds have been known. In Japanese Patent Laid Open Nos. 62-10045, 62-135449 and 63-233932, carboxylic acid ester compounds having a similar structure of molecule to the present invention have been disclosed and such compounds showing liquid crystal properties are also discussed. However, the compounds in the above disclosures are compounds which contain an asymmetric carbon atom bonded to a methyl group. These compounds should be distinguished from the present invention. In addition, when used as a liquid crystal composition, these compounds have disadvatages because of having a weak contrast. For example, when a liquid crystal compound of the following formula (C) where an asymmetric carbon element and a methyl group instead of an ethyl group are bonded is used in a liquid crystal element, a tendency to show a weak contrast is obtained. Moreover, a liquid crystal compound having propyl or more highly alkyl group instead of ethyl groups is not only hard to synthesis themselves, but also when used as a liquid crystal element, an asymmetric carbon atom becomes high in rigidity and a tendency of reducing the liquid crystal properties is seen.

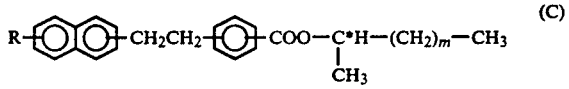
(C)

Furthermore, a carboxylic acid ester compound comprising the bonding of an asymmetric carbon atom to a trifluoromethyl group is disclosed in Japanese Patent Laid Open No. 1-139551. However, this compound has a different main chain of molecule from the present invention.

SUMMARY OF THE INVENTION

It is an object of this invention to provide a novel carboxylic acid ester compound.

It is another object of this invention to provide a liquid crystal compound and liquid crystal composition capable of forming a display device having excellent characteristics such as an operating temperature range around room temperature or lower, a broad operating temperature width, a high switching speed, a switching threshold voltage value within a proper range, and an operability with an extremely small consumed electric power.

It is a further object of this invention to provide a liquid crystal element having characteristics of the above compound or composition and particularly excellent in orienting property of liquid crystal material and a great contrast and a method for producing the same, and a use of said liquid crystal element.

The carboxylic acid ester compound related to this invention is represented by the formula [A];

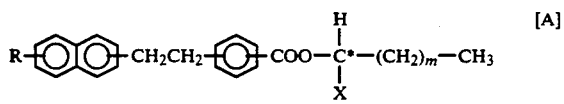
[A]

wherein R represents one radical selected from the group consisting of an alkyl group having 6-18 carbon atoms, an alkoxy group having 6-18 carbon atoms, and halogenated alkyl group having 6-18 carbon atoms, X represents $-CF_3$, or $-CH_2-CH_3$, m is an integral number of 1-10 when X is $-CF_3$ and an integral number of 2-10 when X is $-CH_2-CH_3$, and C* represents an asymmetric carbon atom.

The liquid crystal compounds related to this invention are characterized in that they are represented by the above formula [A].

The carboxylic acid ester compound represented by the formula [A] can be used as a ferroelectric liquid crystal compound as it has optical activity.

The use of such carboxylic acid ester compounds as liquid crystal compounds enables to obtain various devices having excellent characteristics such as an operating temperature range around room temperature or lower, a high switching speed, an extremely small consumed power, and a stabilized contrast.

The liquid crystal composition related to this invention which is comprised of at least one kind of the carboxylic acid ester compounds represented by the formula [A].

The liquid crystal element related to this invention, which is comprised of a cell composed of two substrates and a gap formed by said two substrates and a liquid crystal material filled in the gap of said cell, is characterized in that said liquid crystal material is a liquid crystal composition comprising at least one kind of carboxylic acid ester compound represented by the formula [A].

The liquid crystal element related to this invention, which is comprised of a cell composed of two substrates and a gap formed by said two substrates and a liquid crystal material filled in the gap of said cell, is characterized in that an orientation controlling layer is provided on the surface facing the liquid crystal material of at least one substrate, and said liquid crystal material comprises the compound represented by the formula [A].

The liquid crystal element related to this invention, which is comprised of a cell composed of two substrates and a gap formed by said two substrates and a liquid crystal material filled in the gap of said cell, is characterized in that two orientation controlling layers are provided on the substrates so that the orientation treatment directions of the orientation controlling layers are nearly parallel to each other, and the sense of directions are opposite or the same to each other, in other words, two orientation controlling layers are provided on the surface of each substrate made into contact with the liquid crystal material so that the orientation direction of the liquid crystal compound molecule oriented by the regulating force of one orientation controlling layer is nearly parallel to the direction by the regulating force of the other orientation controlling layer, and the sense of orientation directions are substantially opposite or the same to each other, and said liquid crystal material comprises the compound represented by the formula [A].

The method of producing a liquid crystal element related to this invention, in which a liquid crystal element comprising a cell composed of two substrates and a gap formed by said two substrates and a liquid crystal material filled in the gap of said cell, comprises using a cell having an orientation controlling layer on the surface facing the liquid crystal material of at least one of the substrates, filling the gap of said cell with a liquid crystal material comprising a compound represented by the formula [A], and cooling the cell from the temperature at which the liquid crystal material shows an isotropic phase or higher to the temperature at which it shows a liquid crystal or lower.

In the method of producing a liquid crystal element related to this invention, a cell having two orientation controlling layers provided on the respective surface of the substrates made into contact with the liquid crystal material so that the orientation treatment directions of the orientation controlling layers are nearly parallel to each other, and the sense of directions are opposite or the same to each other is preferably used. After filling the gap of the cell with the liquid crystal material comprising the compound represented by the formula [A], the cell is preferably cooled from the temperature at which the liquid crystal material shows an isotropic phase or higher to the temperature at which it shows a liquid crystal or lower, at a temperature descending rate not more than 2° C./min.

A liquid crystal display device and an electro-optical display device related to this invention are characterized by using the above-said liquid crystal elements.

The liquid crystal compounds, liquid crystal compositions and liquid crystal elements according to this invention are particularly excellent in orienting property of liquid crystal material molecule, and also excellent in liquid material characteristics such as a great contrast, an operating temperature range around room temperature or lower, a broad operating temperature width, a high switching speed, and a small consumed electric power.

When the liquid crystal element of this invention is produced according to the method as described above, the orienting property of the liquid crystal material is particularly improved, and thus a liquid crystal element excellent in liquid crystal characteristics such as a high contrast ratio, an operating temperature range around room temperature or lower, a broad operating temperature width, a high switching speed, and a small consumed electric power.

DESCRIPTION OF PREFERRED EMBODIMENTS

Figure 1:
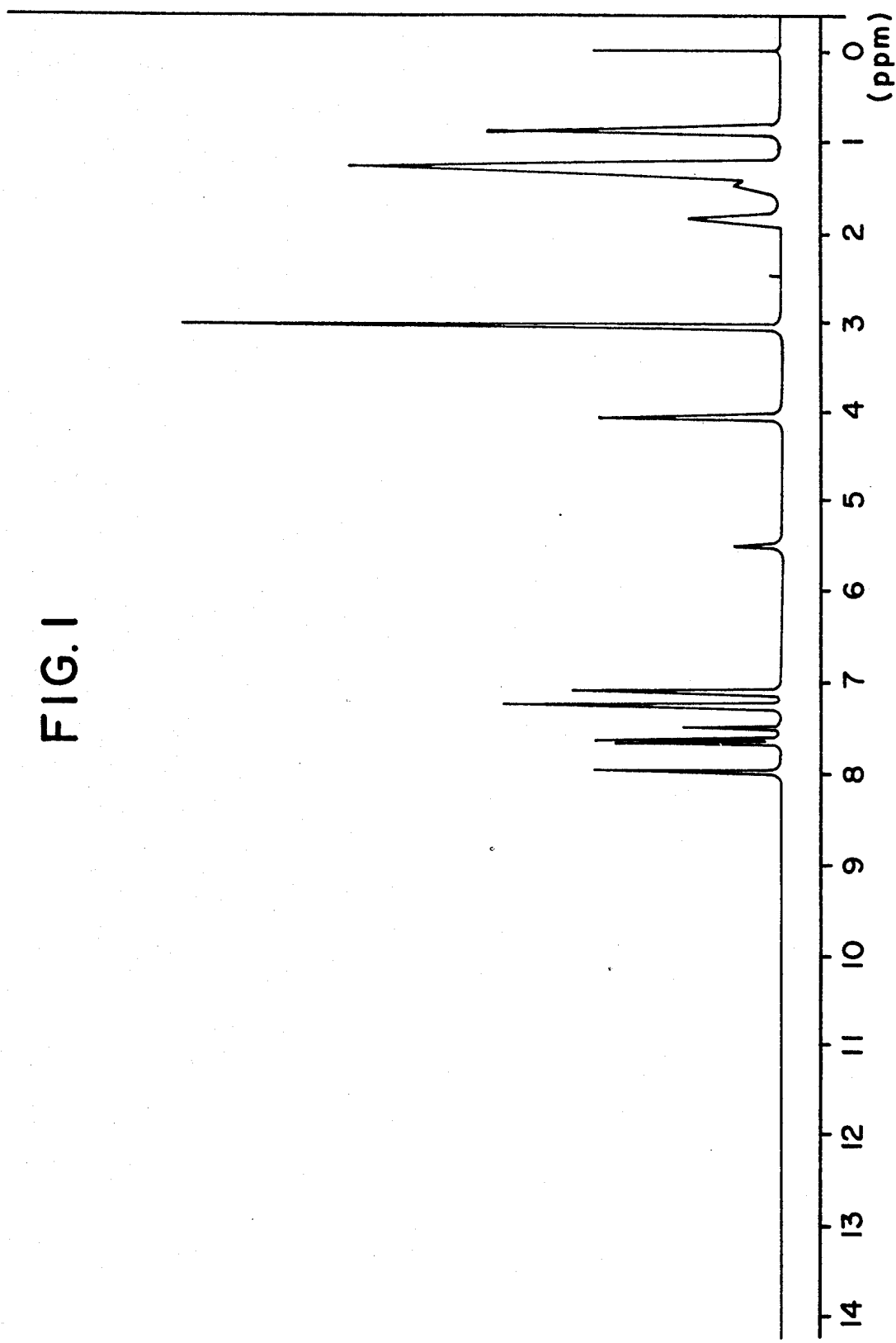
FIG. 1 shows a NMR chart of a carboxylic acid ester compound (VIII) of this invention in which a substituent bonded to the asymmetric carbon atom is trifluoromethyl group ($-CF_3$).

The carboxylic acid ester compounds, liquid crystal compounds, liquid crystal compositions, liquid crystal elements, the method of producing said elements, and other uses according to this invention are specifically illustrated.

The carboxylic acid ester compounds related to this invention are represented by the formula [A];

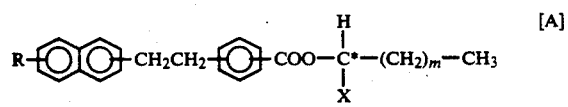

[A]

wherein R represents one radical selected from the group consisting of an alkyl group having 6-18 carbon atoms, an alkoxy group having 6-18 carbon atoms, and a halogenated alkyl group having 6-18 carbon atoms, X represents $-CF_3$ or $-CH_2-CH_3$, m is an integral number of 1-10 when X is $-CF_3$ and an integral number of 2-10 when X is $-CH_2-CH_3$, and C* represents an asymmetric carbon atom.

When R is an alkyl group having 6-18 carbon atoms in the above formula [A], any alkyl groups of straight chain structure, branched chain structure, and alicyclic forms can be used, but a carboxylic acid ester wherein R is an alkyl group of the straight chain structure shows an excellent liquid crystal property, as its molecule has a straight extended stiff structure. Specific examples of the straight chain alkyl groups include n-hexyl, n-heptyl, n-octyl, n-decyl, n-dodecyl, n-tetradecyl, and n-octadecyl groups.

When R is a halogenated alkyl group having 6-18 carbon atoms, examples of such halogenated alkyl groups include a group in which at least a part of hydrogen atoms in the alkyl group as described above is substituted by a halogen atom such as F, Cl, Br or I.

When R is an alkoxy group having 6-18 carbon atoms, examples of such alkoxy groups include an alkoxy group having an alkyl group as described above. Specifically, the alkoxy groups include n-hexoxy group, n-heptoxy group, n-octyloxy group, n-decyloxy group, n-dodecyloxy group, n-tetradecyloxy group, and n-octadecyloxy group.

Among the compounds having R as described above, the compound having n-alkoxy group shows particularly excellent liquid crystal property.

In the formula [A], m is an integral number of 1-10 when X is $-CF_3$. The compounds having m of 4-6 are useful as liquid crystal compounds, and particularly, the compound having the following group wherein m is 5 is most useful as the liquid crystal compounds.

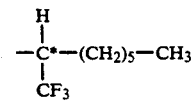

In the formula [A], m is an integral number of 2-10 when X is $-CH_2-CH_3$. The compounds having m of 4-6 are useful as the liquid crystal compound, and particularly the compound having the following group wherein m is 4 is most useful as the liquid crystal compound.

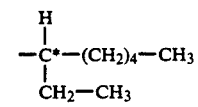

In the carboxylic acid ester compounds of this invention, a trifluoromethyl group and an alkyl group wherein m is 1-10, or an ethyl group and an alkyl group wherein m is 2-10 are bonded to the asymmetric carbon atom C*.

The asymmetric carbon atom is bonded to a phenylene group by ester bonding.

In the formula [A], the phenylene groups include o-phenylene group, m-phenylene group and p-phenylene group. When the carboxylic acid ester compound of this invention is particularly used as the liquid crystal compound, the molecule itself is preferred to have a straight form, so that p-phenylene group is preferred as the phenylene group.

The phenylene group is bonded to a naphthylene group through an ethylene group represented by $-CH_2CH_2-$.

The naphthylene groups include 1,4-naphthylene, 1,6-naphthylene, 1,7-naphthylene, 1,8-naphthylene, 2,5-naphthylene, 2,6-naphthylene, and 2,7-naphthylene groups. When the carboxylate compound of this invention is particularly used as a liquid crystal compound, the molecule itself is preferred to have a straight form, so that 2,6-naphthylene group is preferred as the naphthylene group.

This naphthylene group may have an alkyl group having about 1-3 carbon atoms, and the liquid crystal characteristic of the carboxylic acid ester compound is never reduced by possessing such substituent.

The other bonding partner of this naphthylene group is bonded to the above mentioned R.

As the carboxylic acid ester compounds related to this invention which are represented by the above formula [A], the compounds represented by the following formula [1]–[8] are specifically given.

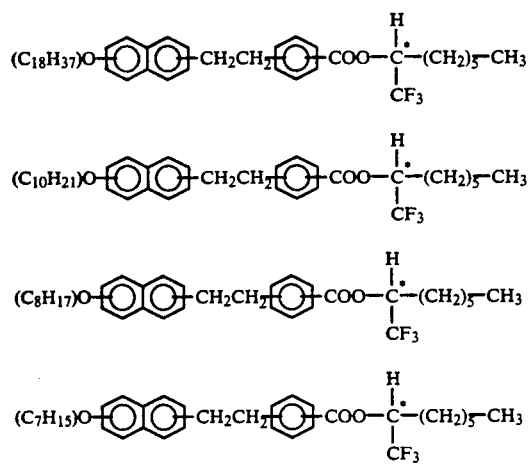

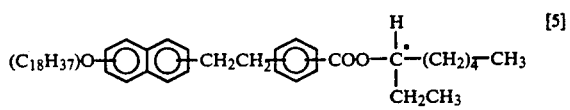
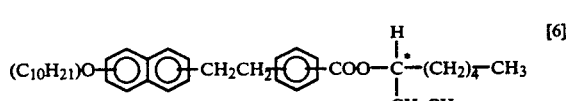
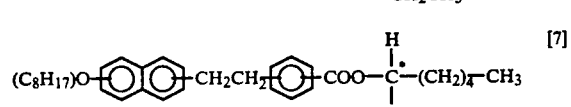
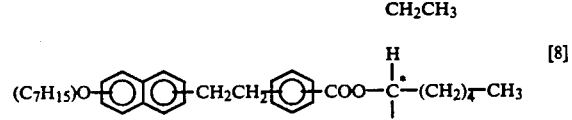
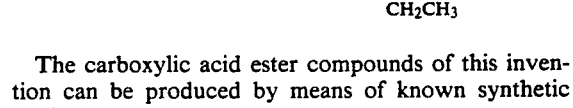

The carboxylic acid ester compounds of this invention can be produced by means of known synthetic methods.

For example, the ester compounds of this invention can be synthesized according to the following synthetic route.

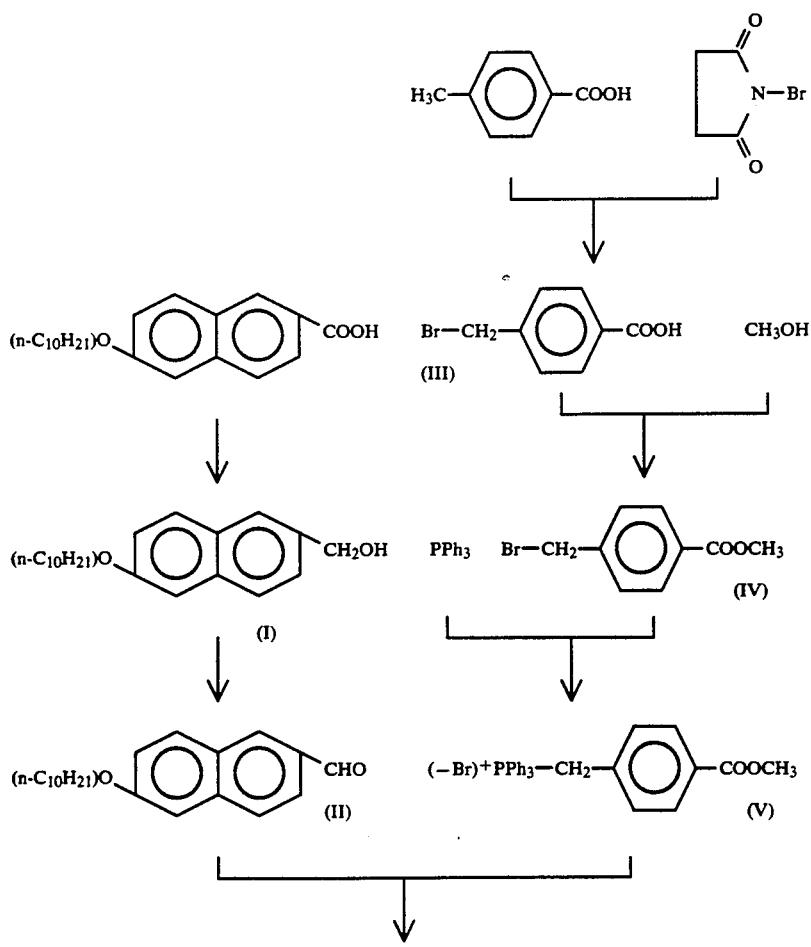

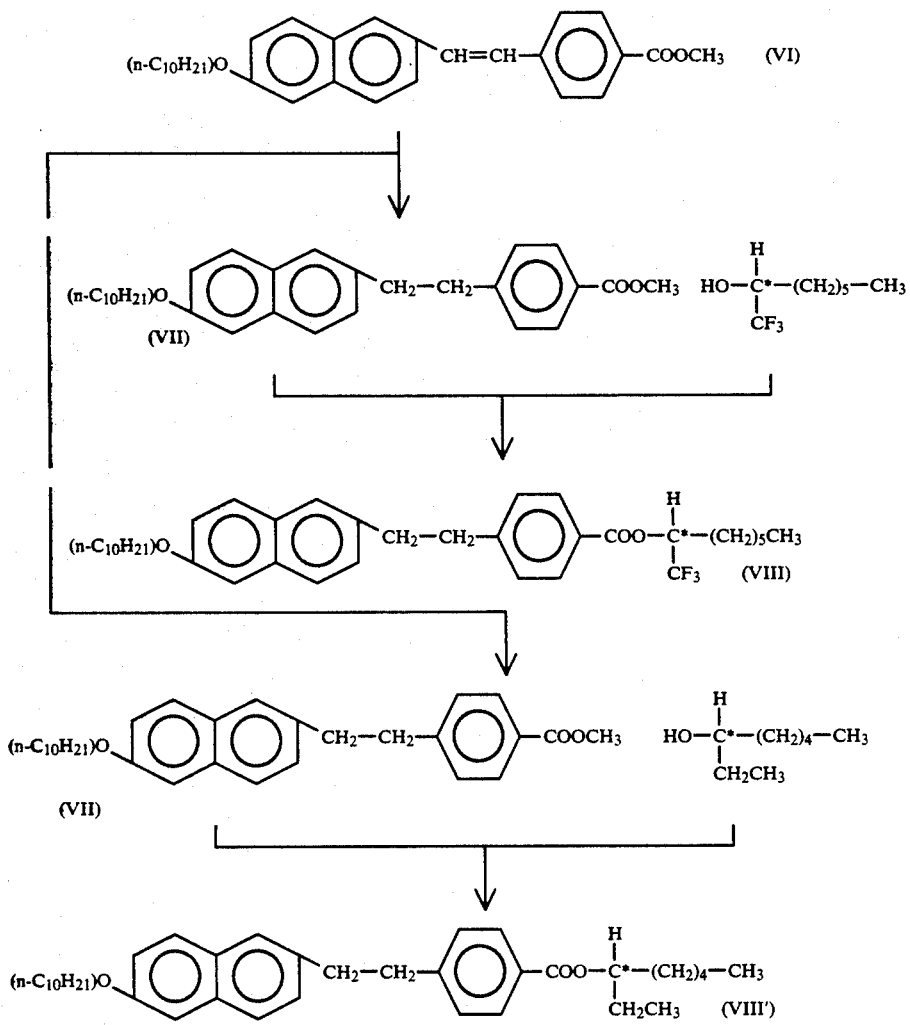

Namely, an alkoxy naphthalene carboxylic acid such as 6-decyloxynaphthalene-2-carboxylic acid is treated with a hydrogenating agent such as lithium aluminium hydride to obtain a hydroxy compound of alkoxynaphthalene such as 6-decyloxy-2-hydroxymethyl naphthalene (I).

This hydroxy compound (I) is reacted with an oxidizing agent such as activated manganese dioxide to obtain an alkoxynaphthalene aldehyde such as 6-decyloxynaphthalene-2-aldehyde (II).

On the other hand, p-toluic acid is reacted with a halogenating agent such as N-halosuccinimide in the presence of a reaction initiator such as benzoyl peroxide to obtain a halide such as 4-(halomethyl)benzoic acid (III).

The esterification reaction of this halide (III) with an alcohol such as methanol affords a 4-(halomethyl)benzoic acid alkyl ester (IV). This 4-(halomethyl)benzoic acid alkyl ester (IV) is reacted with triphenyl phosphine to obtain a halide (V) such as (alkoxycarbonylbenzyl)-triphenylphosfonium halide.

The above-said alkoxynaphthalene aldehyde such as 6-decyloxynaphthalene-2-aldehyde (II) is reacted with a halide such 6-decyloxynaphthalene-2-aldehyde (II) which is reacted with a halide such as (alkoxycarbonylbenzyl)triphenylphosfonium halide (V) to obtain a cis-trans isomeric mixture (VI) wherein the phenylene group is bonded to the naphthylene group by the ethenylene group, which is represented by the formula (VI).

This cis-trans isomeric mixture (VI) is reacted with hydrogen in the presence of a hydrogenating agent such as palladiumcarbon to hydrogenate the ethenylene group present near the center of the cis-trans isomeric mixture (VI), obtaining a compound represented by the formula (VII).

The compound (VII) is reacted with a α-trifluoromethyl alcohol having an asymmetric carbon atom such as 1-trifluoromethyl heptanol-1, whereby a carboxylic acid ester compound (VIII) of this invention can be obtained.

The reaction of the compound (VII) with an α-trifluoromethyl alcohol having an asymmetric carbon atom such as 1-ethylhexanol-1, instead of 1-trifluoromethyl heptanol, can afford a carboxylic acid ester compound (VIII') of this invention.

The carboxylic acid ester compound represented by the formula [A] which is obtained as described above can be used as the liquid crystal compound. Particularly, the carboxylic acid ester compound having optical activity can be used as the ferroelectric liquid crystal compound.

Among these carboxylic acid ester compounds, a compound in which m is 4–6, preferably 5, and R is an alkoxy group having 6–18 carbon atoms when X is $CF_3$ in the formula [A], and a compound in which m is 2–10, particularly preferably 4, and R is an alkoxy group having 6–18 carbon atoms when X is $-CH_2-CH_3$ in the formula [A] are useful. Among these compounds, the compounds represented by the following formulae (VIII) and (VIII') in which the phenylene group is p-phenylene group and the naphthylene group is 2,6-naphthylene group show particularly excellent liquid crystal characteristics.

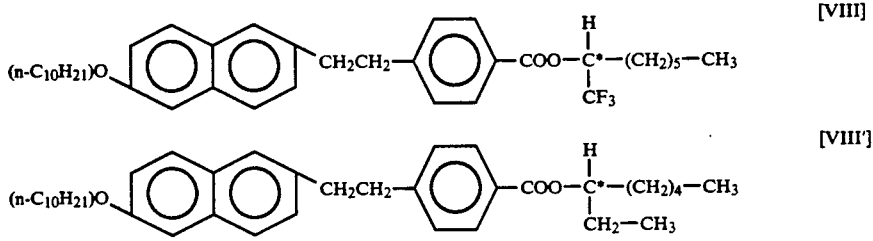

The phase transition temperature of the liquid crystal compound (VIII) is shown in Table 1. In the tables shown below, CRY represents a crystalline phase, SmC* represents a chiral smetic C phase, SmA represents a smetic A phase, and Iso represents an isotropic liquid.

TABLE 1

| Phase transition | CRY-SmC* | SmC*-SmA | SmA-Iso |
|---|---|---|---|
| Phase transition temperature | −13° C. | | −6° C. |

The phase transition temperature of the liquid crystal compound (VIII') is shown in Table 2.

TABLE 2

| | CRY-SmC* | SmC*-Iso |
|---|---|---|
| Phase transition temperature | <−30° C. | 3° C. |

Many of the liquid crystal compounds of this invention show smetic phases at around room temperature or lower than a freezing point as shown in Tables 1 and 2.

Conventionally, a liquid crystal compound showing a smetic phase at a temperature not more than 20° C. like these compounds, when used independently, is hardly known.

Not only do the liquid crystal compounds of this invention show smetic phases at low temperatures, but also the optical switching elements produced using these liquid crystal compounds are excellent also in high-speed responsibility.

The liquid crystal compounds of this invention can be used independently, but are preferably used by mixing other liquid crystal compounds. For example, the liquid crystal compound of this invention can be used as the major ingredient of a chiral smetic liquid crystal composition or the minor ingredient of a liquid crystal composition having another compound showing the smetic phase as the major ingredient, to form a liquid crystal composition of this invention.

Namely, a liquid crystal compound showing ferroelectric property as the carboxylic acid ester compound used in this invention causes an optical switching phenomenon by the application of a voltage, which phenomenon can be utilized to produce a display device having a satisfactory responsibility [refer to e.g., U.S. Ser. No. 110,451 corresponding to Japanese Patent Application No. 56-17216 and Japanese Patent Laid Open No. 59-118744].

Generally, the ferroelectric liquid crystal compounds used in the above display device are compounds showing any one of chiral smetic C phase, chiral smetic F phase, chiral smetic I phase and chiral smetic H phase. However, as reaction of the display device using liquid crystal compounds showing chiral smetic phases without chiral smetic C phase is slow in general, conventionally, it is common that the driving by chiral smetic C phase having a fast reaction is favorable to use. However, when the driving way by chiral smetic A phase, which is suggested by inventors of this invention as in Japanese Patent Application No. 62-157808, is used in this invention, the ferroelectric liquid crystal compounds of not only chiral smetic C phase, but also chiral smetic A phase are used in this invention. Thus, the liquid crystal compositions including the liquid crystal compounds of this invention have properties of liquid crystal temperature width and fast electro-optical response.

The liquid crystal compositions related to this invention are further illustrated. The liquid crystal composition related to this invention comprises at least one kind of carboxylic acid ester compounds represented by the formula [A].

As the liquid crystal composition of this invention comprises at least one of the carboxylic acid ester compounds [A], they exhibit the properties possessed by the above carboxylic acid ester compounds [A].

Table 3 shows an example in which the phase transition temperature of a liquid crystal composition is reduced by using the carboxylate compound (VIII) as described above. As shown in Table 3, the use of (+)6-decyloxy-2-[2-{4-((1-trifluoromethyl)-heptyl)oxycarbonyl}phenyl]ethyl-naphthalene(A1) as a carboxylic acid ester compound results in reductions in phase transition temperatures of the liquid crystal materials represented by the formula (B);

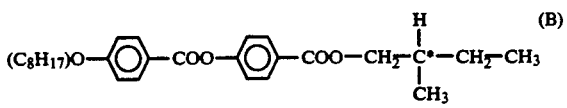

Concretely, the phase transition temperature of Cry-SmC* is reduced from 27° C. to −30° C., that of SmC*-SmA from 30° C. to 15° C., and that of SmA-Iso from 53° C. to 36° C.

TABLE 3

| Compound or composite | Phase transition temp. | | |
|---|---|---|---|
| | CRY-SmC* | SmC*-SmA | SmA-Iso |
| (A₁) | −13° C. | | −6° C. |
| (A₁) 43 wt % + (B) 57 wt % | <−30° C. | 15° C. | 36° C. |
| (B) | 27° C. | 30° C. | 53° C. |

Note: In the above table, (A₁) represents

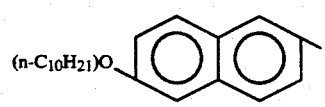 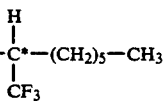

Table 4 shows another example in which the phase transition temperature of liquid crystal composition is reduced by using the carboxylate compounds as described above. As shown in Table 4, (+)6-decyloxy-2-[2-{4-(1-ethylhexyl)oxycarbonyl}phenyl]ethyl-naphthalene (A1) is used as the carboxylic acid ester compounds, and the phase transition temperature of the liquid crystal material represented by the above (B) is reduced by the use of said compound. Concretely, the phase transition temperature of Cry-SmC* is reduced from 27° C. to −30° C., that of SmA-Iso from 53° C. to 32° C.

TABLE 4

| Compound or composite | Phase transition temp. | | |
|---|---|---|---|
| | CRY-SmC* | SmC*-SmA | SmA-Iso |
| (A₂) | <−30° C. | | 3° C. |
| (A₂) 50 wt % + (B) 50 wt % | <−30° C. | | 36° C. |
| (B) | 27° C. | 30° C. | 53° C. |

Note: In the above table, (A₂) represents

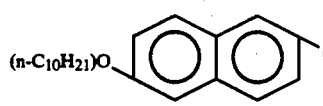 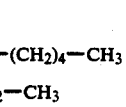

When a liquid crystal composition is produced using the liquid crystal compounds of this invention, these liquid crystal compounds can be used as the major ingredient and also as the minor ingredient as described above.

In the liquid crystal composition comprising the liquid crystal compounds of this invention, the content of the liquid crystal compound represented by the formula [A] can be suitably determined in consideration of the characteristics of the used liquid crystal compound, the viscosity of the composition, the operating temperature, and the uses. The liquid crystal compound is desirably used in an amount ranging from 1-99% by weight, preferably 5-75% by weight to the total weight of the liquid crystal material in the liquid crystal composition.

The liquid crystal composition may comprise one of the liquid crystal compounds of this invention or a mixture of two or more of them.

In such liquid crystal compositions, examples of the compounds showing chiral smetic C phase which can be blended together with the liquid crystal compound represented by the formula [A] include (+)-4'-(2''-methylbutyloxy)phenyl-6-octyloxynaphthalene-2-carboxylate, 4'-decyloxyphenyl-6-((+)-2''-methylbutyloxy)naphthalene-2-carboxylate,

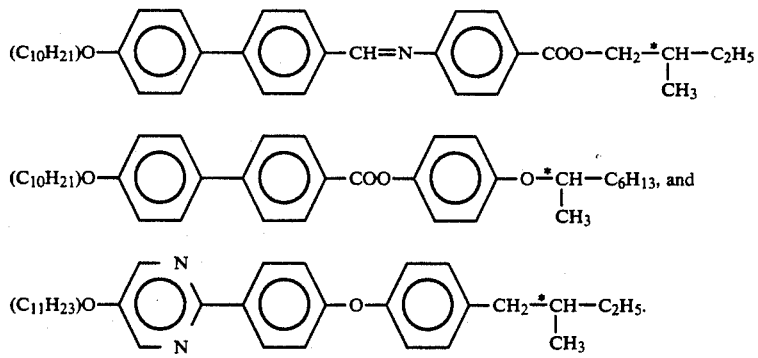

Examples of liquid crystal compounds other than the above compounds showing the chiral smetic C phase which can constitute the liquid crystal compositions by blending with the carboxylate compound represented by the formula [A] include nematic type liquid crystal compounds typified by Schiff's base liquid crystal compounds such as

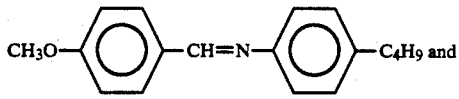

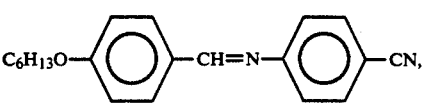

azoxy liquid crystal compounds such as

-continued

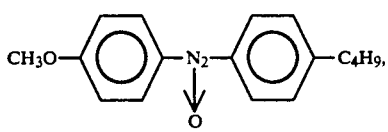

benzoic acid ester liquid crystal compounds such as

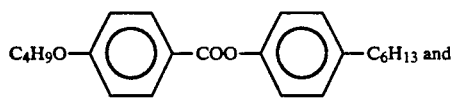

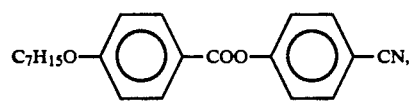

cyclohexyl carboxylic acid ester liquid crystal compounds such as

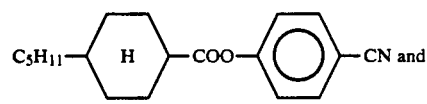

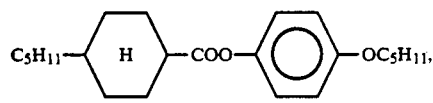

biphenyl liquid crystal compounds such as

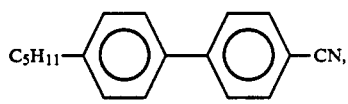

terphenyl liquid crystal compounds such as

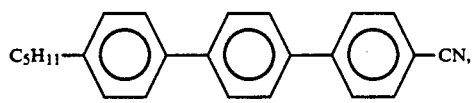

cyclohexyl liquid crystal compounds such as

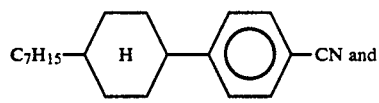

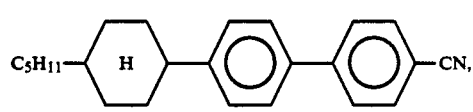

and pyridine liquid crystal compounds such as

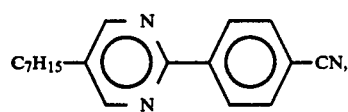

and, further, cholesteric liquid crystal compounds such as cholesterin chloride, cholesterin nonanoate, and cholesterin oleate, and public known smetic type liquid crystal compounds.

When a display element is formed using the liquid crystal compound and liquid crystal composition related to this invention, for example, additives capable of blending with general liquid crystal compounds such as a conductivity providing agent or a life improving agent may be blended in addition to the above liquid crystal compounds.

The liquid crystal compounds and liquid crystal composition related to this invention can be used in devices such as a white taylor type color display device, a cholesteric nematic phase transfer type display device, and a reverse domain generation preventing device in TN type cell.

The liquid crystal compounds showing the smetic phase among the liquid crystal compounds related to this invention can be used in memory type liquid crystal display elements such as thermal writing type display element and laser writing type display element.

The liquid crystal compounds having particularly ferroelectric property among the liquid crystal compounds of this invention can be preferably used in liquid crystal elements such as optical switching element, piezoelectric element and pyroelectric element for optical shutter and liquid crystal printer, as well as the uses as described above.

As a specific example of the display method using the liquid crystal compound of this invention, the following method can be given.

A first method comprises injecting a liquid crystal compound related to this invention into a thin film cell having a gap of several $\mu$m (e.g., 2–5 $\mu$m), utilizing the regulating force of the substrate for orientating each molecule of the ferroelectric liquid crystal compound in parallel to the substrate, then laying the thin film cell having the thus oriented liquid crystal compound between two polarizing plates, applying an external electric field to the thin film cell, changing the orientation vector of the ferroelectric liquid crystal compound, thereby utilizing two polarizing plates and the birefringenece of the ferroelectric liquid crystal compound for displaying.

In the thin film cell as described above, when the chiral smetic phase is shown in the liquid crystal compound, the chiral smetic phase has a bistability, since the liquid crystal compound of this invention has lower symmetry. Thus, the optical switching of the cell is accomplished by means of turning over the electric fields between two stable states.

In the liquid crystal compounds of this invention, as the ferroelectric liquid crystal compound having the chiral smetic phase has a spontaneous polarization, once an external electric field is applied to the cell, it has memory effect after stopping the application of the electric field. Thus, as it is not necessary to keep the supply of voltage for applying the electric field, a display device comprising this kind of thin film cell is able to decrease its consumed electric power, and the contrast of the display device is stabilized and cleared. The switching element using the liquid crystal compound showing the chiral smetic phase is capable of switching only by changing the orientation direction of the molecule, and also capable of the low voltage driving because the primary term of the electric field strength acts on the driving.

As the use of this switching element enables the realization of a high-speed response less than several ten microseconds, the scanning time of each element is significantly shortened, and thus a display with a large image plane having numbers of scanning lines can be produced.

As this display is operated at room temperature or lower, it can be easily scanned without using an auxiliary means for temperature control.

In the liquid crystal compounds of this invention, the molecules are inductively inclined also in the smetic A phase having no bistability, when an electric field is applied thereto. Thus, this property can be utilized for the optical switching.

As the liquid crystal compound and compositions of this invention show two or more stable states, the optical switching can be conducted similarly to the case of the smetic A phase.

A second display method using the liquid crystal compounds of this invention is a method in which the liquid crystal compound of this invention is mixed with a dichroic dye to utilize the dichorism of the dye, and the display is carried out changing the absorbed wavelength of light by the dye, thereby changing the orientation direction of the ferroelectric liquid crystal compound. The dye used in this case is usually a dichroic dye, and examples of the dichroic dyes include azo dyes, naphthoquinone dyes, cyanine dyes, and an dyes.

The liquid crystal compounds of this invention can be also adapted in various display methods generally used, as well as the display methods described above.

The display devices produced using the liquid crystal compound of this invention can be driven by means of driving systems such as an electrical address display, e.g., static driving, simple matrix driving and complex matrix driving, an optical address display, a thermal address display and an electron beam address display.

This invention is further specifically illustrated with respect to the liquid crystal elements.

Figure 3:
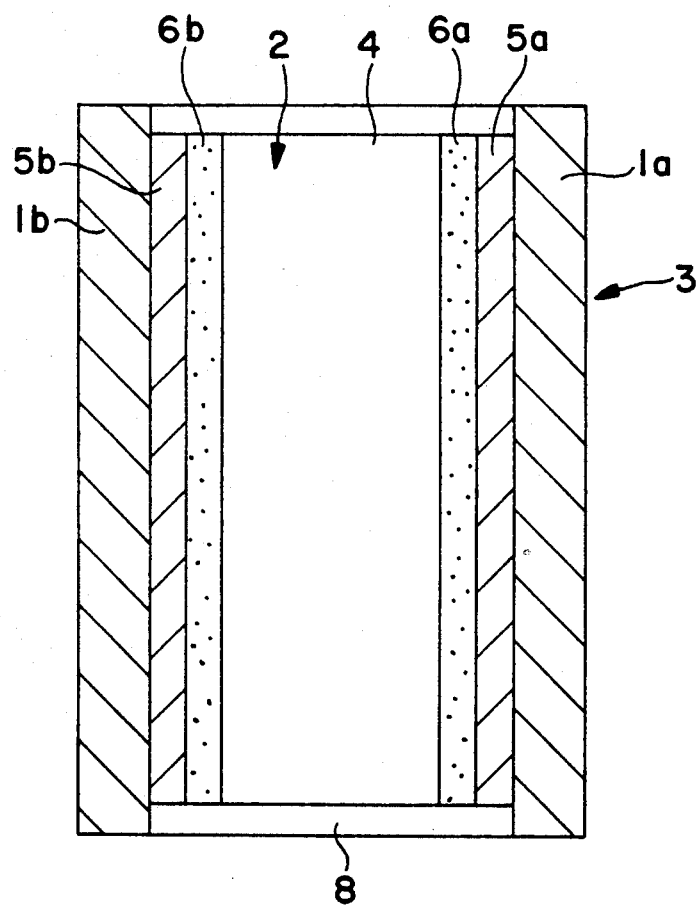
FIG. 3 is a schematic sectional view of a liquid crystal element according to this invention.

FIG. 3 illustrates an example of the cross section of a liquid crystal element related to this invention.

The liquid crystal element related to this invention basically consists of a cell 2 composed of two transparent substrates(hereinafter simply referred also to as substrates) 1a, 1b and a gap 2 formed by said two substrates 1a, 1b and a liquid crystal material 4 filled in the gap 3 of the cell 2, as shown in FIG. 3.

At least one of these substrates 1a, 1b is required to be transparent, and as the substrates, glass or transparent plastics such as polycarbonate is used.

On the surfaces facing the liquid crystal material of the substrates 1a, 1b are provided with electrodes 5a, 5b generally composed of indium oxide-tin. Further, in this invention, a transparent electrode substrate having a transparent electrode integrally formed on a substrate as described above can be used as the substrate.

An orientation controlling layer to orient the filled liquid crystal material is preferably provided on at least one of the electrodes 5a, 5b.

In the liquid crystal element of this invention, an orientation controlling layer is preferably provided on at least one surface made into contact with the liquid crystal compound of the substrates. Thus, in this invention, the orientation controlling layer is preferably provided on one of the substrates or, on the both substrates. FIG. 3 shows a state in which two orientation controlling layers are provided, with the orientation controlling layer being shown as 6a, 6b.

The orientation controlling layers may be formed of organic or inorganic materials. The orientation controlling layers formed of organic materials include, for example, films composed of resins such as polyvinyl alcohol, polyimide, polyamide imide, polyester, polycarbonate, poly vinylacetal, poly vinyl chloride, poly vinyl acetate polyamide, polystyrene, siloxane polyimide, cellulose resin, melamine resin, urea resin, and acryl resin. The orientation controlling layer may be hardened bodies of cyclized rubber photo resists, phenol novolak photo resists or electron beam photo resists such as polymethyl methacrylate and epoxidized 1,4-polybutadiene. The orientation controlling layer may be formed of inorganic materials, and examples of the materials forming the inorganic orientation controlling layer include SiO, GeO, $Al_2O_3$, $Y_2O_5$, $ZrO_2$, $MgO_2$, and $CeF_3$.

In this invention, the polyimide film is particularly preferably used among these resins. The polyimide means a resin comprising polyimide as the main component. Any polyimide may be used if it is a polymer comprising an imide bonding, and such polyimide preferably has a film forming ability. The specific examples of polyimides include YUPILEX-R manufactured by Ube Industries, Ltd., SANEVA-130 manufactured by Nissan Chemical Industries, Ltd., AL-1251 manufactured by Japan Synthetic Rubber Co., Ltd., KERIMID 601 manufactured by Nippon Polyimide Co., Ltd., and HL-1100 manufactured by Hitachi Chemical Co., Ltd. However, they are not limited by these specific examples. Other resins such as polyamides may be compriseed within a range not damaging the characteristics of polyimide, and resins comprising component units other than the imide component unit may be used. Also, the orientation controlling layers may be formed by using polyimide for one film, and a proper organic or inorganic material for the other.

The orientation controlling layer can be formed by using correspondingly to the used materials various methods such as a method of coating the surface made in contact with the liquid crystal of the substrate with the resin as described above, for example, by means of spin coat method, a method of heat treating the thus coated surface, a method of sticking a resin film thereto, a method of applying a photosensitive resin thereto and then irradiating with an energy beam for hardening, and a method of evaporating an inorganic material thereon.

The thickness of the orientation controlling layer generally ranges from 0.005 to 0.25 μm, and preferably from 0.01–0.15 μm.

In this invention, two orientation controlling layers are preferably provided on the respective surface made in contact with the liquid crystal material of the substrates so that the orientation direction of the liquid crystal material oriented by the regulating of one orientation controlling layer is nearly parallel to the orientation direction of the liquid crystal material oriented by the regulation force of the other orientation controlling layer, and also the respective orientation vectors are substantially opposite to each other. The orientation controlling layers 6a, 6b have the effect of orienting the liquid crystal material. Thus, when the orientation controlling layers are disposed in opposite parallel to each other as described above, and then the liquid crystal material is subjected to an orientation treatment, the initial orienting property of the liquid crystal material injected into the cell is improved to afford a liquid crystal element excellent in contrast.

In this invention, the film used to as orientation controlling layers are preferably subjected to orientation treatment. The orientation of film prompt to orient the liquid crystal molecule in a determined direction. In the case of polyimide film, the orientation treatment can be carried out by rubbing in one direction with the cloth.

The cell used in this invention has a gap 2 for filling the liquid crystal material formed by two substrates 1a, 1b having the thus formed orientation controlling layers 6a, 6b. This gap 2 can be formed, for example, by disposing the substrates 1a, 1b with a spacer 8 around. The disposition of the spacer 8 enables to maintain the gap 2 for filling the liquid crystal material and also to prevent a leakage of the liquid crystal material. The gap 2 can be formed by using a spacer forming a side wall as described above, and also by blending a particle having a determined particle size as an inner spacer with the liquid crystal material.

The width of the thus formed gap i.e., the length between the substituent 1a, and 1b, is generally within a range of 1.5-7.0 μm, preferably 1.8-5.0 μm.

In the liquid crystal element of this invention, various thin films such as photoconductive film, light shielding film, and light reflective film may be used in the element.

In the liquid crystal element of this invention, the liquid crystal material is filled in the gap 2 of the cell.

The liquid crystal material used in this invention, comprises the liquid crystal compound represented by the formula [A]. The liquid crystal compounds represented by the formula [A] may be used independently, but a liquid crystal composition comprising at least one kind of liquid crystal compounds represented by the formula [A] is preferred.

The liquid crystal element of this invention can be basically produced by filling a liquid crystal material comprising the above carboxylic acid ester compounds in the gap of the cell.

The liquid crystal material is generally heated into the melted state, and filled or injected in this state into the gap of the cell having the vacuumed inside. After filling the liquid crystal material, the cell is generally sealed.

The sealed cell is heated to the temperature at which the liquid crystal material in the cell shows an isotropic phase or higher, and then cooled to the temperature at which the liquid crystal material shows a liquid crystal phase or lower.

The temperature descending rate in the cooling is preferably not more than 2° C./min. The temperature descending rate is preferably within a range of 0.1°-2.0° C./min., and particularly preferably within a range of 0.1°-0.5° C./min. The limitation of the cooling rate for cooling the cell provides a liquid crystal element excellent in initial orienting property which has a liquid crystal phase composed of a monodomain having no orientation defect. The initial orienting property means the arrangement condition of the liquid crystal material before changing its orientation vector by applying a voltage thereto. The thus obtained liquid crystal element is remarkably excellent in contrast.

The carboxylic acid ester compounds related to this invention are novel compounds showing smetic phase at around room temperature or lower, for example, at a temperature less than a freezing point. Thus, these compounds are used as ferroelectric liquid crystal compounds.

The blending of the liquid crystal compound related to this invention with the same kind and/or other kind of liquid crystal compounds enables an extension of the temperature operating width without losing the ferroelectric property of the liquid crystal compound of this invention.

Thus, display elements as having a high-speed response even at less than room temperature, for example, a temperature less than the freezing point can be obtained by using these liquid crystal compounds or liquid crystal compositions.

In a liquid crystal display manufactured using such element, the scanning time can be significantly shortened.

As the carboxylic acid ester compound used in this invention has a spontaneous poralization, a liquid crystal element having memory effect even after removal of the electric field can be obtained by using the cell filled with this compound.

By using this liquid crystal element, a liquid crystal display device or an electro-optical display device having a small consumed electric power and a stabilized contrast can be obtained. The devices also can be driven at low voltage. These liquid crystal elements are preferably used in switching elements, liquid crystal display devices, or electro-optical display devices used at a temperature lower than room temperature, as they utilize the bistability in the smetic phase of the carboxylic acid ester compound.

As the liquid crystal elements are produced by the methods as described above in this invention, a liquid crystal element having a particularly excellent contrast can be easily produced.

This invention is further illustrated according to preferred embodiments, but is never limited by these embodiments.

EXAMPLE 1

Synthesis of 6-decyloxy-2-[2-{4-((1-trifluoromethyl)heptyl)oxycarbonyl}phenyl]ethyl-naphthalene (VIII) represented by the formula

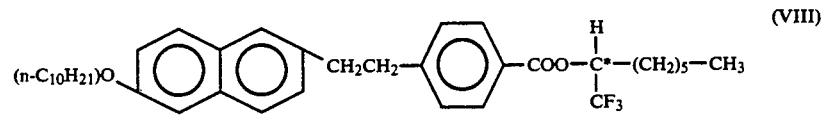

First Step

Synthesis of 6-decyloxy-2-hydroxymethylnaphthalene (I)

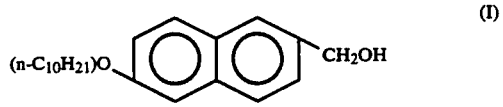

1.0 g of lithium aluminium hydride was suspended into 50 ml of anhydrous THF. To this suspension, 100 ml of anhydrous THF solution of 1.348 g (4 mmol) of 6-decyloxynaphthalene-2-carboxylic acid was added dropwise. After the completion of the dropping, the temperature was raised to room temperature, and the stirring was conducted for 2 hours. Further, the mixture was heated and continuously reacted under reflux for 1 hour.

After the reaction was carried out for 1 hour as described above, the reaction mixture was allowed to cool, and then diluted with 150 ml of ether. A saturated aqueous solution of sodium sulfate was added thereto to decompose the excessive LiAlH₄, and the reaction was stopped.

After the completion of the decomposition of LiAlH₄, a white solid material was precipitated. This solid material was filtered with a glass filter, and the filtrate was dried with anhydrous sodium sulfate to remove a low boiling point material, and a crude product was obtained.

This crude product was recrystallized from hexane/ethyl acetate mixed solvent (mixed volume ratio=5:1) to obtain 1.08 g of 6-decyloxy-2-hydroxymethylnaphthalene (I). Yield 85.8%.

Second Step

Synthesis of 6-decyloxynaphthalene-2-aldehyde (II)

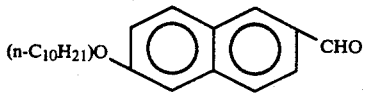

(II)

In 10 ml of chloroform, 84 mg (0.43 mmol) of the thus obtained 6-decyloxy-2-hydroxymethylnaphthalene was dissolved, and 235 mg (2.57 mmol) of activated manganese dioxide powder was added. The oxidation reaction was carried out with vigorous stirring at room temperature for 12 hours.

The resulting reaction mixture was filtered with celite as a filtering assistant, and the separated filtrate was concentrated to obtain a crude product.

This crude product was purified with thin layer chromatography of silica gel (solvent: hexane/ether=3/1 (volume:ratio)), and 72.2 mg of white crystals of decyloxynaphthalene-2-aldehyde (III). Yield 87%.

Third Step

Synthesis of 4-(Bromomethyl)benxoic acid (III)

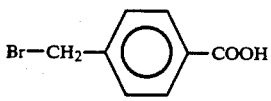

(III)

13.6 g (100 mmol) of p-toluic acid

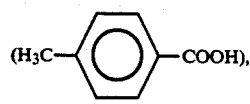

17.8 g (100 mmol) of N-bromo succinoimide

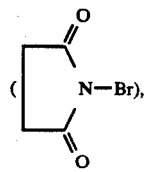

and 1 g (4.1 mmol) of dibenzoyl peroxide were suspended in 125 ml of carbon tetrachloride, and the mixture was heated under vigorous stirring and reacted under reflux (oil bath 93° C., inner temp. 74° C.) for 2 hours to obtain a reaction mixture of yellow milky liquid.

The reaction mixture was cooled in an ice bath, and the precipitated crystalline product was filtered and washed with hexane. The crystalline product was further washed with water, and recrystallized from ethanol to obtain 14.6 g of white needle crystals of 4-(bromomethyl)benzoic acid (III). Yield 67.7%.

Forth Step

Synthesis of methyl 4-(bromomethyl)benzoate (IV)

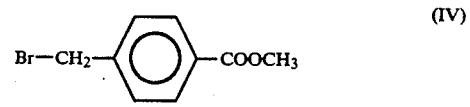

(IV)

4-(Bromomethyl)benzoic acid (III) was esterified by heating with methanol under reflux in the presence of an acidic catalyst, whereby methyl 4-(bromomethyl)benzoate (IV) was obtained.

Fifth Step

Synthesis of (methyloxycarbonylbenzyl)triphenylphosphonium bromide (V)

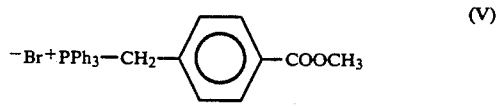

(V)

2.61 g (11.4 mol) of methyl 4-(bromomethyl)benzoate (IV) synthesized in the 4th step and 3.0 g (11.45 mmol) of triphenylphosphine were dissolved in 100 ml of benzene, and the temperature was raised to the reflux temperature under stirring, at which temperature, the reaction was carried out for 2 hours.

Thereafter, the reaction mixture was cooled with ice water, and the precipitated crystals were subjected to suction filtration.

The obtained crystals were recrystallized from benzene to obtain 2.43 g of white crystals of the phosphonium salt (V). Yield 43%.

Sixth Step

Synthesis of (VI)

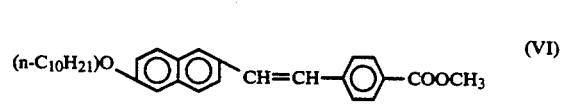

(VI)

475 mg (2.47 mmol) of 6-decyloxynaphthalene-2-aldehyde (II) obtained in the 2nd step and 1215 mg (2.74 mmol) of the phosphonium salt (V) were dissolved in 10 ml of methylene chloride, and a 0.5 ml aqueous solution of 140 mg (2.5 mmol) of potassium hydroxide was added dropwise to this solution under room temperature.

By this dropwise addition of potassium hydroxide, triphenylphosphine oxide was formed, and the reaction mixture was suspended in milky white color. After the completion of the addition, the reaction was further continued for 2 hours.

After the completion of the reaction, the resulting reaction mixture was filtered, and the separated filtrate was concentrated. The residue was purified by column chromatography packed with silica gel to obtain 519 mg of a cis-trans isomeric mixture (VI). Yield 52%.

A part of the obtained reaction product was taken out and analyzed by gel permeation chromatography (GPC), and as a result, the isomeric constitution ratio of cis-form to trans-form was 4:1.

Seventh Step

Synthesis of (VII)

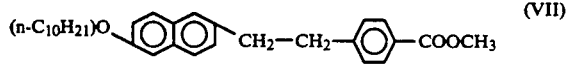

The cis-trans mixture (VI) synthesized in the 6th step was reacted with bubbling of hydrogen under room temperature and ordinary pressure, using 5% palladium-carbon catalyst as a catalyst and ethanol as a solvent to hydrogenate the olefinic double bond in the center part of the compound (VI). After removing the Pd-C catalyst using a filtering assistant celite, the filtrate was concentrated, whereby a desired product (VII) could be nearly quantitatively obtained. Yield 100%.

Eighth Step

Synthesis of (VIII)

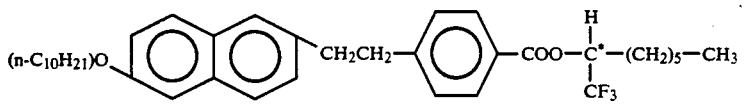

446 mg (1 mmol) of the ester compound (VII) obtained in the 7th step, 368 mg (2 mmol) of R-1-trifluoromethyl heptanol, and 11 mg (0.1 mmol) of t-butoxypotassium were added to 20 ml of benzene, and the mixture was reacted under reflux for 25 hours. After cooling, the insoluble material was filtered off, and the benzene layer was washed with water and concentrated. The obtained concentrate was separated using column chromatography, whereby 360 mg of a white solid (melting point 37°-39° C.) was obtained. Yield 60 mol %.

This solid (VIII) showed the FD-mass spectrum value of M/e=599.

The NMR chart of the thus obtained carboxylic acid ester compound (VIII) is shown in FIG. 1.

EXAMPLE 2

The (+)-6-decyloxy-2-[2-(4-((1-trifluoromethyl)heptyl)oxycarbonyl)phenyl]ethyl-naphthalene (VIII) liquid crystal compound synthesized in Example 1 was measured for phase transition temperature. The result is the same as shown in Table 1.

EXAMPLE 3

(VII) was synthesized through the same steps as in Example 1 from the 1st step to the 7th step.

Synthesis of (VII)

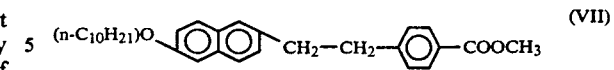

466 mg (1 mmol) of the ester compound (VII) obtained in the 7th step, 260 mg (2 mmol) of 1-ethylhexanol, and 11 mg (0.1 mmol) of t-butoxypotassium were added to 20 ml of benzene, and the mixture was reacted under reflux for 25 hours. After cooling, an insoluble material was filtered, and the benzene layer was washed with water and then concentrated. The obtained concentrate was separated using column chromatography, whereby 305 mg of a white solid was obtained.

Figure 2:
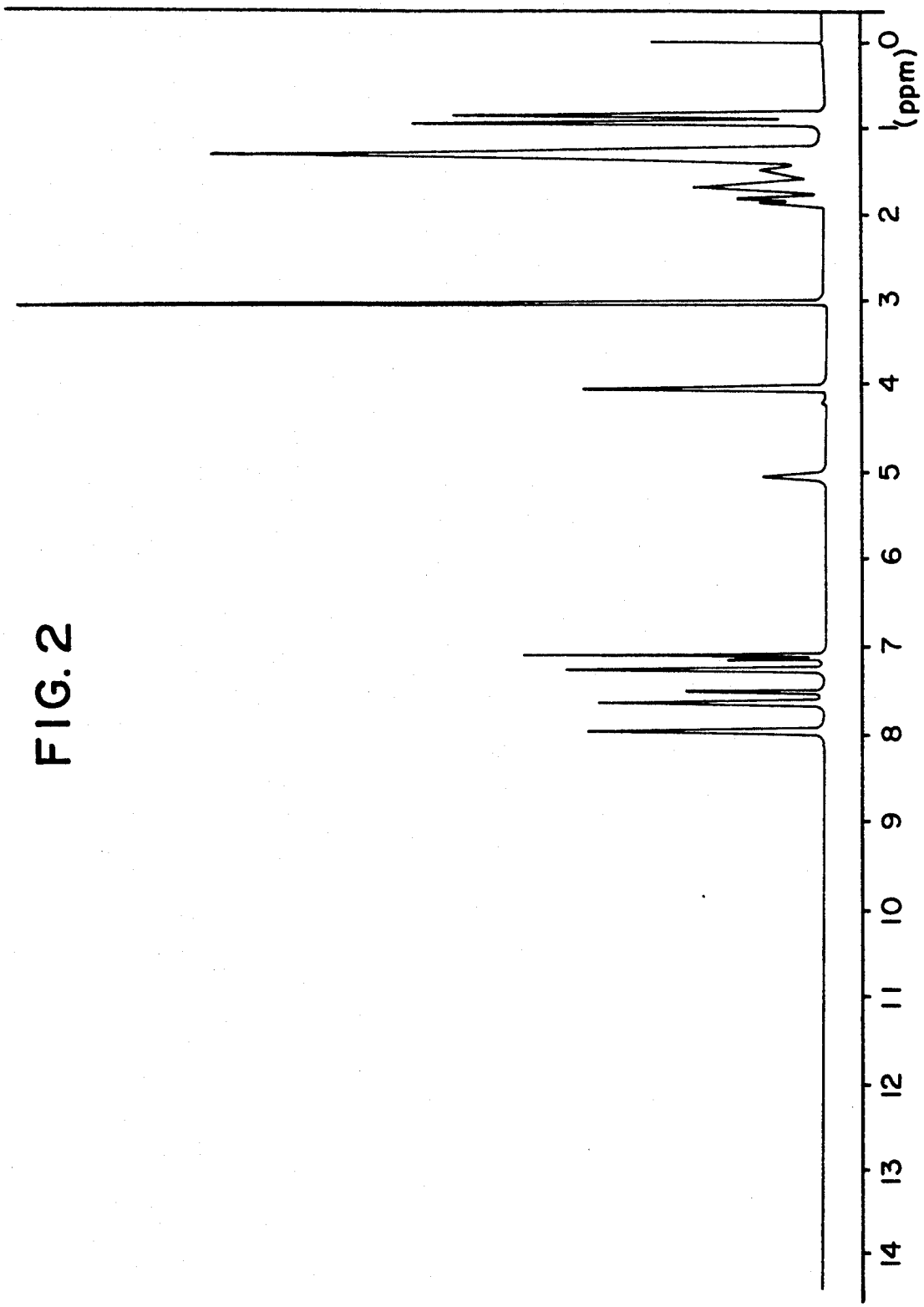
FIG. 2 shows a NMR chart of a carboxylic acid ester compound (VIII') of this invention in which the substituent is ethyl group ($X=-CH_2-H_3$).

The FD-mass spectrum of this solid was M/e=544. The chart of $^1$H-NMR spectrum was shown in FIG. 2. From the results of these analyses, this compound was identified as the desired 6-decyloxy-2-[2-{4-(1-ethylhexyl)oxycarbonyl}phenyl]ethyl-naphthalene (VIII'). Yield 56.1 mol %.

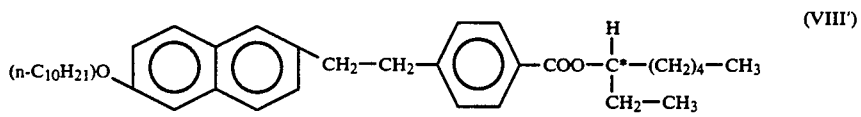

EXAMPLE 4

The 6-decyloxy-2-[2-{4-((1-ethyl)hexyl)oxycarbonyl}phenyl]ethyl-naphthalene (VIII') liquid crystal compound synthesized in the above Example 3 was measured for phase transition temperature.

The result was the same as shown in Table 2.

EXAMPLE 5

The carboxylic acid ester compound (A1) represented by the formula (VIII) which was obtained in Example 1 was mixed with a compound represented by the following formula (B) in a weight ratio of 43:57 to produce a liquid crystal composition. invention.

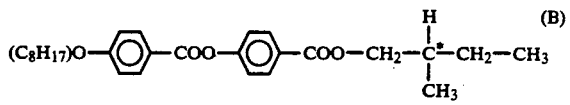

This composition was measured for phase transition temperature. The result was the same as shown in Table 3.

The phase transition temperature of the compound (B) was also the same as shown in Table 3.

EXAMPLE 6

The liquid crystal composition obtained in Example 5 was filled in a cell shown in FIG. 1 to produce a liquid crystal element.

The thus obtained liquid crystal element had an operating temperature range of 36° to −30° C., and the contrast was stabilized in this temperature range.

EXAMPLE 7

The carboxylic acid ester compound (A2) represented by the formula (VIII') which was obtained in Example 3 was mixed with a compound represented by the following formula (B) in a weight ratio of 50:50 to produce a liquid crystal composition.

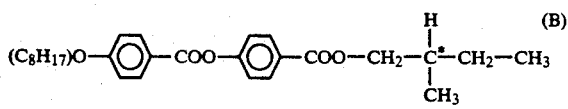

This composition was measured for phase transition temperature. The result was the same as shown in Table 4.

The phase transition temperature of the compound represented by the above formula (B) was also the same as shown in Table 4.

EXAMPLE 8

The liquid crystal composition obtained in example 7 was filled in a cell shown in FIG. 1 to produce a liquid crystal element.

The thus obtained liquid crystal element had a use temperature range of 32° to −30° C., and the contrast was stabilized in this temperature range.

EXAMPLE 9

As shown in FIG. 3, in a cell in which orientation controlling layers composed of two sheets of polyimide film rubbed having the thickness of 150 Å (PIQ-5400 manufactured by Hitachi Chemical Co., Ltd.) were formed on the inner surfaces of transparent electrode substrates so that the orientation control directions were laid in the same direction, the carboxylic acid ester compound (A1) produced in Example 1 was melted, and injected into the gap of the cell being laid in a reduced pressure state.

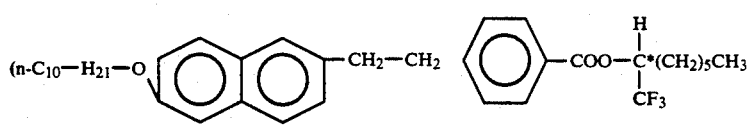

[A1]

The cell thus filled with the liquid crystal material was heated to 60° C., maintained at 60° C. for 5 minutes, and then cooled to −10° C. at a rate of 1° C./min. to produce a liquid crystal element.

The obtained liquid crystal element was measured to obtain the contrast of 5.

Cell Conditions (a) Outer size; length 2.5 cm × width 2.2 cm × thickness 1.5 mm,
(b) Substrate, thickness 0.7 mm, substrate material (glass)
(c) Distance between substrates: 2 μm
(d) Side wall size; length 1.8 cm × width 0.1 cm × thickness 2 μm The cell used for evaluation of liquid crystals was produced according to the following method. A glass substrate with an ITO transparent electrode film is coated with an ITO transparent electrode film is coated with polyimide. Namely, polyimide (PIQ-5400 manufactured by Hitachi Chemical Co., Ltd.) was applied to the ITO transparent electrode by means of spin coat method. The polyimide was diluted to 1.2% with N-methylpyrolidone as a solvent, and spin-coated at 2000 rpm. The coated substrate was heated at 325° C. for 30 minutes for hardening, and a polyimide film with a thickness of 150-200 Å could be prepared. The polyimide film was rubbed with a nylon cloth in one direction, thereby providing a liquid crystal orienting property.

Two thus formed glass substrates coated with polyimide film were piled to form an evaluation cell. An epoxy type adhesive was applied on the glass bases coated with the polyimide film by means of silk printing to adhere the two bases to each other and control the cell gap. As the epoxy type adhesives, a mixture of an adhesive main agent (LCB-3048, manufactured by EHC), a hardening agent (LCB-310B, manufactured by EHC), and a bead for cell gap control (GP-20, manufactured by EHC), in the weight ratio of 138:30:3 was used. One glass plate was coated with the epoxy type adhesive to stick the plates so that the polyimide films were faced to each other. This was hardened according to the following hardening conditions: 50° C.—15 min, 60° C.—15 min, 70° C.—15 min. 80° C.—15 min, 125° C.—30 min, and 170° C.—60 min.

The thus formed evaluation cell having a cell gap of about 2 μm was used for the evaluation of liquid crystals.

In this invention the contrast was determined by putting a liquid crystal element between polarizers that polarize light in directions crossing at right angles and measuring the transmitted light strengths in the light and the dark obtained by rotating the liquid crystal element, and calculating the ratio of I (light)/I (dark).

EXAMPLE 10

A liquid crystal element was produced in the same manner as in Example 9, except changing the cooling rate to 0.1° C./min in Example 9.

The obtained liquid crystal element showed a contrast of 9.

EXAMPLE 11

A liquid crystal element was produced in the same manner as in Example 9 except changing the cooling rate to 10° C./min in Example 9.

The obtained liquid crystal element had a contrast of 1, and showed a tendency of slightly reducing the contrast because of the high temperature descending rate.

EXAMPLE 12

As shown in FIG. 3, in a cell in which orientation controlling layers composed of two sheets of polyimide film rubbed having the thickness of 150 Å (PIQ-5400 manufactured by Hitachi Chemical Co., Ltd.) were formed on the inner surfaces of transparent electrode substrates so that the orientation control directions were laid in the same direction, the carboxylic acid ester compound (A2) produced in Example 3 was melted, and injected with the gap of the cell being laid in a reduced pressure state.

The cell thus filled with the liquid crystal material was heated to 60° C., maintained at 60° C. for 5 minutes, and then cooled to −10° C. at a rate of 1 C/min. to produce a liquid crystal element. The other conditions and evaluation method are the same as in Example 9.

At a result of measurement, the obtained liquid crystal element showed a contrast of 8.

EXAMPLE 13

A liquid crystal element was produced in the same manner as in Example 12 except changing the cooling rate to 0.1° C./min in Example 12.

The obtained liquid crystal element showed a contrast of 9.

EXAMPLE 14

A liquid crystal element was produced in the same manner as in Example 12 except changing the cooling rate to 10° C./min in Example 12.

The obtained liquid crystal element had a contrast of 2, and showed a tendency of slightly reducing the contrast because of the high temperature descending rate.

EXAMPLE 15

As shown in FIG. 3, in a cell in which orientation controlling layers were formed on the inner surfaces of transparent electrode substrates so that the orientation control directions were opposite each other, the carboxylic acid ester compound ($A_1$) produced in Example 1 was fused, and injected with the gap of the cell being laid in a reduced pressure state.

The cell thus filled with the liquid crystal material was heated to 60° C., maintained at 60° C. for 5 minutes, and then cooled to −10° C. at a rate of 1° C./min. to produce a liquid crystal element. The other conditions and evaluation method are the same as in Example 9.

At a result of measurement, the obtained liquid crystal element showed a contrast of 7.

EXAMPLE 16

A liquid crystal element was produced in the same manner as in Example 15 except changing the cooling rate to 0.1° C./min in Example 15.

The obtained liquid crystal element showed a contrast of 12.

EXAMPLE 17

A liquid crystal element was produced in the same manner as in Example 15 except using the composite obtained in Example 9 instead of the carboxylic acid ester compound and changing the cooling rate to 0.1° C./min in Example 15.

The obtained liquid crystal element showed a contrast of 13.

COMPARATIVE EXAMPLE 1

A liquid crystal element was produced in the same manner as in Example 15 except changing the rubbing direction (orientation direction) of two orientation controlling layers so that they are mutually parallel and the orientation directions are directed in the same direction, and changing the cooling rate to 10° C./min. in Example 15.

The obtained liquid crystal element showed a contrast of 1.

EXAMPLE 18

As shown in FIG. 3, in a cell in which orientation controlling layers were formed on the inner surfaces of transparent electrode substrates so that the orientation control directions were opposite each other, the carboxylic acid ester compound ($A_2$) was used. The other conditions and evaluation method are the same as in Example 12.

At a result of measurement, the obtained liquid crystal element showed a contrast of 9.

EXAMPLE 19

A liquid crystal element was produced in the same manner as in Example 18 except changing the cooling rate to 0.1° C./min. in Example 18.

The obtained liquid crystal element showed a contrast of 16.

EXAMPLE 20

A liquid crystal element was produced in the same manner as in Example 18 except using the composition obtained in Example 7 instead of the carboxylic acid ester compound ($A_2$) and changing the cooling rate to 0.1° C./min. in Example 18.

The obtained liquid crystal element showed a contrast of 14.

COMPARATIVE EXAMPLE 2

A liquid crystal element was produced in the same manner as in Example 18 except changing the rubbing direction (orientation direction) of two orientation controlling layers so that they are mutually parallel and the orientation directions are directed in the same direction, and changing the cooling rate to 10° C./min. in Example 18.

The obtained liquid crystal element showed a contrast of 1.

COMPARATIVE EXAMPLE 3

A liquid crystal element was produced in the same manner as in Example 12 except using a carboxylic acid ester compound represented by the following formula (A3) instead of the carboxylic acid ester compound represented by the formula (VIII').

The obtained liquid crystal element showed a weak contrast of 1.3.

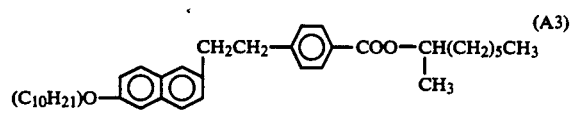

What is claimed is:

1. A carboxylic acid ester compound represented by the formula (A);

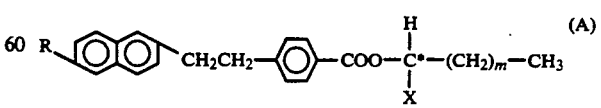

wherein R represents a radical selected from the group consisting of an alkyl group having 6–18 carbon atoms, an alkoxy group having 6–18 carbon atoms, and a halogenated alkyl group having 6–18 carbon atoms, X represents —$CF_3$ or —$CH_2$—$CH_3$, m is an integral number of 1-10 when X is —CF$_3$, and an integral number of 2-10 when X is —CH$_2$—CH$_3$, and C* represents an asymmetric carbon atom.

2. A liquid crystal compound represented by the following formula (A);

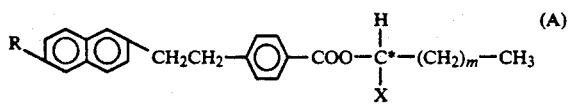

wherein R represents a radical selected from the group consisting of a straight chain alkyl group having 6-18 carbon atoms, a straight chain alkoxy group having 6-18 carbon atoms, and a halogenated straight chain alkyl group having 6-18 carbon atoms, X represents —CF$_3$ or —CH$_2$—CH$_3$, m is an integral number of 1-10 when X is —CF$_3$, and an integral number of 2-10 when X is —CH$_2$—CH$_3$, and C* represents an asymmetric carbon atom.

3. A liquid crystal compound according to claim 2 wherein in the formula [A], m is an integral number of 4-6, and R is said alkoxy group.

4. A liquid crystal compound according to claim 3 wherein in the formula [A], X is —CF$_3$ and m is 5.

5. A liquid crystal compound according to claim 3 wherein in the formula [A], X is —CH$_2$—CH$_3$, and m is 4.

6. A liquid crystal composition comprising at least one carboxylic acid ester compound represented by the following formula (A) and at least one other liquid crystal compound;

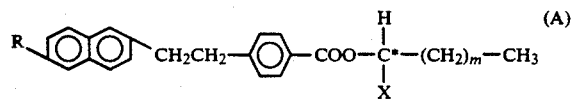

wherein R represents a radical selected from the group consisting of an alkyl group having 6-18 carbon atoms, an alkoxy group having 6-18 carbon atoms, and a halogenated alkyl group having 6-18 carbon atoms, X represents —CF$_3$ or —CH$_2$—CH$_3$, m is an integral number of 1-10 when X is —CF$_2$—CH$_3$, and C* represents an asymmetric carbon atom.

7. A liquid crystal composition according to claim 6 wherein the content of the at least one carboxylic acid ester compound (A) ranges from 1 to 99% by weight to the total amount of liquid crystal materials in the composition.

8. A liquid crystal element comprising a cell and a liquid crystal material filled in said cell, said liquid crystal material comprising at least one carboxylic acid ester compound represented by the following formula (A);

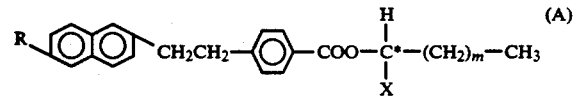

wherein R represents a radical selected from the group consisting of an alkyl group having 6-18 carbon atoms, an alkoxy group having 6-18 carbon atoms, and a halogenated alkyl group having 6-18 carbon atoms, X represents —CF$_3$ or —CH$_2$—CH$_3$, m is an integral number of 1-10 when X is —CF$_3$, and an integral number of 2-10 when X is —CH$_2$—CH$_3$, and C* represents an asymmetric carbon atom.

9. A liquid crystal element according to claim 8 wherein the cell is provided with two substrates and a gap formed by said substrates, the liquid crystal material is filled in said gap, and an orientation controlling layer is provided on the surface facing the liquid crystal material of at least one substrate.

10. A liquid crystal element according to claim 9 wherein at least one orientation controlling layer is treated to have orientation.

11. A liquid crystal element according to claim 9 wherein orientation controlling layers are provided on each of the substrates so that the orientation treatment directions of the orientation controlling layers are nearly parallel and they are opposite to each other.

12. A liquid crystal element according to claim 9 wherein at least one orientation controlling layer is a polyimide film.

13. A liquid crystal element according to claim 10 wherein the orientation treatment method of orientation controlling layers is a rubbing treatment method.

14. A method of producing a liquid crystal element comprising a cell composed of two substrates and a gap formed by said two substrates, and a liquid crystal material filled in the gap of said cell, said method comprising using a cell having an orientation controlling layer provided on the surface facing the liquid crystal material of at least one substrate, filling the gap of the cell with the liquid crystal material comprising a compound represented by the following formula (A), and cooling the cell from the temperature at which the liquid crystal material shows an isotropic phase or higher to the temperature at which it shows a liquid crystal or lower:

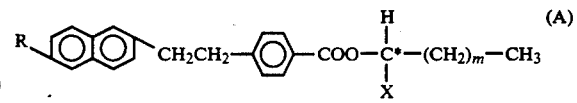

wherein R represents a radical selected from the group consisting of an alkyl group having 6-18 carbon atoms, an alkoxy group having 6-18 carbon atoms, and a halogenated alkyl group having 6-18 carbon atoms, X represents —CF$_3$ or —CH$_2$—CH$_3$, m is an integral number of 1-10 when X is —CF$_3$, and an integral number of 2-10 when X is —CH$_2$—CH$_3$, and C* represents an asymmetric carbon atom.

15. A method according to claim 14 wherein the cooling rate is a temperature descending rate of not more than 2° C./min.

16. A method according to claim 14 or 15 wherein a cell having two orientation control films provided so that the orientation treatment directions of the orientation control films are nearly parallel and opposite to each other is used.

17. A method according to claim 16 wherein at least one orientation control film is a polyimide film.

18. A method according to claim 17 wherein the orientation treatment method of the orientation control films is a rubbing treatment method.

19. A liquid crystal display device comprising a liquid crystal element as described in any one of claims 8 to 13.

20. An electro-optical display device comprising a liquid crystal element as described in any one of claims 8 to 13.

21. A method according to claim 14 or 15 wherein at least one orientation control film is a polyimide film.

22. A method according to claim 16 wherein the orientation treatment method of the orientation control films is a rubbing treatment method.

23. The liquid crystal compound of claim 2 or 3 wherein m is 5 and X is —$CF_3$.

24. The liquid crystal compound of claim 2 or 3 wherein m is 4 and X is —$CH_2$—$CH_3$.

25. The liquid crystal composition of claim 6 wherein m is an integer of 4 to 6, and R is a straight chain alkoxy group of from 6 to 18 carbon atoms.

26. The liquid crystal composition of claim 6 or 25 wherein m is 5 and X is —$CF_3$.

27. The liquid crystal composition of claim 6 or 25 wherein m is 4 and X is —$CH_2$—$CH_3$.

28. The liquid crystal compound of claim 2 in which R is n-$C_{10}H_{21}$, m is 4 or 5 and when m is 4, X is —$CH_2$—$CH_3$ and when m is 5, X is —$CF_3$.

* * * * *